United States Patent [19]

Covi et al.

[11] Patent Number: 5,119,059
[45] Date of Patent: Jun. 2, 1992

[54] COMBINED DIFFERENTIAL AND COMMON MODE CHOKE FOR A POWER SUPPLY

[75] Inventors: Kevin R. Covi, Glenford; William J. Petrowsky, Kingston; James H. Spreen, Stone Ridge, all of N.Y.

[73] Assignee: International Business Machines Corporation, Armonk, N.Y.

[21] Appl. No.: 577,347

[22] Filed: Sep. 4, 1990

[51] Int. Cl.⁵ .................. H01F 17/06; G05F 1/325
[52] U.S. Cl. .................. 336/175; 323/250; 363/39
[58] Field of Search ............ 336/210, 174, 175, 165; 323/250, 308, 331, 362; 363/39, 44, 45, 46, 144, 53, 52, 178; 174/68.2, 708; 307/147, 148

[56] References Cited

U.S. PATENT DOCUMENTS

| | | | |
|---|---|---|---|
| 3,790,860 | 2/1974 | Verdisco | 361/384 |
| 4,210,858 | 7/1980 | Ford et al. | 323/247 |
| 4,292,665 | 9/1981 | Hersom et al. | 363/141 |
| 4,760,484 | 7/1988 | Walker | 361/18 |
| 4,803,609 | 2/1989 | Gillett et al. | 363/17 |
| 4,885,559 | 12/1989 | Nasano | 336/92 |
| 4,960,392 | 10/1990 | Dickie | 439/620 |
| 4,972,167 | 11/1990 | Fujioka | 336/175 |
| 4,980,654 | 12/1990 | Moulton | 333/12 |

FOREIGN PATENT DOCUMENTS 626444 9/1978 U.S.S.R. .................. 336/175

*Primary Examiner*—Steven L. Stephan
*Assistant Examiner*—Ben Davidson
*Attorney, Agent, or Firm*—Mark S. Walker

[57] ABSTRACT

A dual mold choke is provided to reduce both differential and common mode electromagnetic interference. Ferrite cores are placed around DC power bus bars providing an inductor limiting differential mode noise and creating a choke reducing common mode noise. The use of E-cores provides a simplified mechanical assembly while providing high levels of noise reduction. An air gap between the center legs of the cores prevents saturation of the choke.

9 Claims, 2 Drawing Sheets

1

COMBINED DIFFERENTIAL AND COMMON MODE CHOKE FOR A POWER SUPPLY

BACKGROUND OF THE INVENTION

1. Field of the Invention

This invention relates to electrical power converters, and more particularly, to means for reducing electromagnetic interference or noise generated by power converters.

2. Background of the Invention

Electrical power converters are used to supply DC voltage to computer equipment. A typical power converter accepts line AC voltage and converts it into regulated DC voltage. Most computer systems require low voltage DC power, frequently at high current flows.

Modern power supplies employ switching-type regulators that are much smaller and less expensive to construct than earlier generation linear regulators. However, switching regulators generate electromagnetic interference (EMI) or noise because of the very fast rise and fall times of the current and voltage wave forms in the regulator.

The EMI noise generated by the switching regulator radiates from the device and is transmitted through the input and output conductors from the device. The present invention is concerned with noise conducted by the DC output circuit, e.g., the bus bars, that carry the current from the power supply to the operating computer voltage bus. EMI noise can lead to logic errors in the computer device and can cause interference with nearby electrical equipment. The Federal Communications Commission (FCC) and corresponding foreign agencies regulate levels of EMI radiated by an electrical device. It is, therefore, important to control the levels of EMI noise both for device reliability and to meet regulatory requirements.

The EMI transmitted through the bus bars can be classified into two types: differential noise between the positive and negative bus bars; and common noise between each bus bar and ground.

The prior art suggests several means of controlling EMI noise. Most common is the provision of power supply shielding to surround and contain EMI emissions from the power supply. Another frequent approach is to place noise filters on the AC input lines to the power regulator. Such an approach is described in *High Frequency Switching Power Supplies: Theory and Design* by George Chryssis, McGraw-Hill Book Company, 1984, pp. 199-200.

The use of shielding has the disadvantage of adding bulk to the power supply, thereby increasing its costs and assembly complexity. The use of AC line filters helps reduce EMI emissions in general, but is less effective in controlling noise transmitted to the computer device itself which can lead to logic errors.

SUMMARY OF THE INVENTION

The present invention is directed to providing an EMI filter that controls both differential and common mode noise transmitted through the DC output circuit. The filter of the present invention is designed for ease of assembly and effectiveness of operation. The filter of the present invention acts as a dual mode choke, limiting both differential and common noise. A magnetic core is located on the power supply output bus bars such that an outer perimeter magnetic path is formed around both bars and a central magnetic path is formed between the bars. An insulator is provided to hold the core in position. E-cores may be used to increase the ease of assembly.

DETAILED DESCRIPTION OF THE PREFERRED EMBODIMENT

The preferred embodiment will be described with reference to the figures where like components receive the same reference number.

Figure 1:
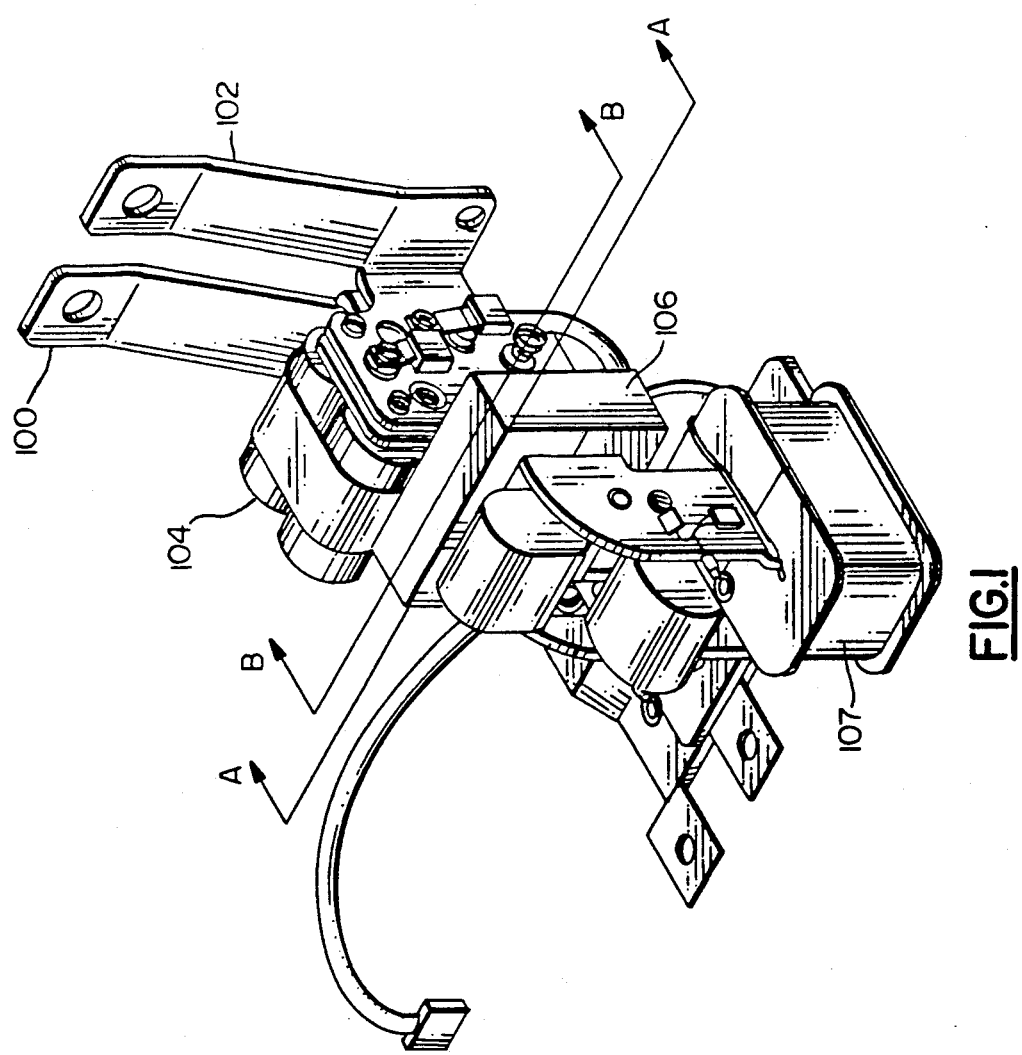
FIG. 1 is a portion of the power supply incorporating the present invention.

A portion of the power supply incorporating the present invention is shown in FIG. 1. Bus bars 100 and 102 are provided for carrying high DC currents to an attached voltage bus (not shown). The current supplied is typically low voltage (e.g., 5 volts), and high amperage (400-500 amps). Attached to the bus bars is capacitor section 104, with dual mode choke according to the present invention 106, and a choke 107.

Figure 2:
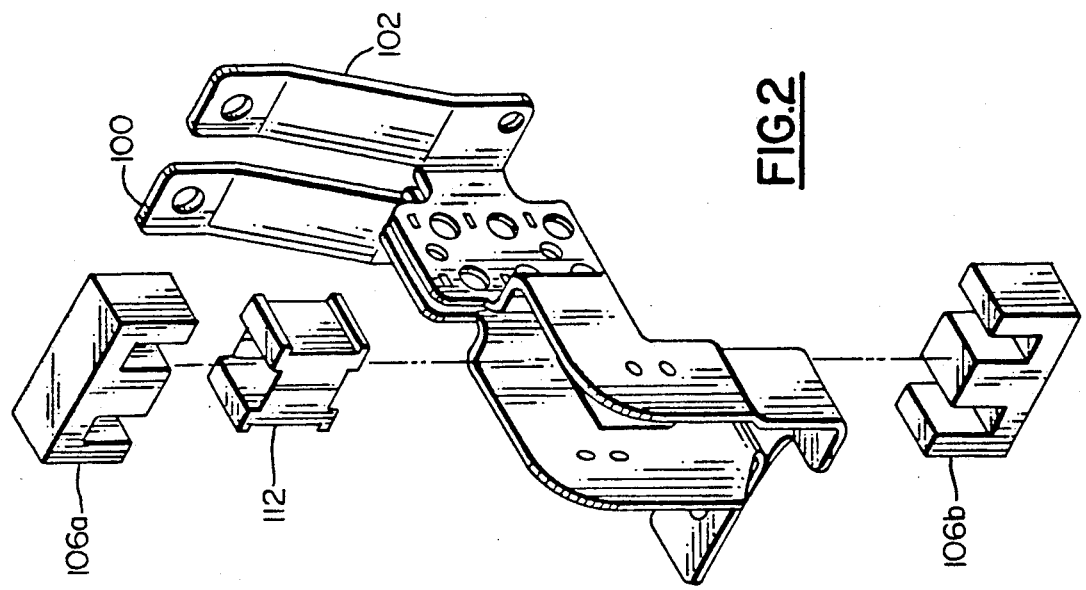
FIG. 2 is an exploded view of the dual mode choke according to the present invention.

The components of dual mode choke 106 are shown in an exploded position in FIG. 2. Choke 106 comprises two ferrite cores 106a and 106b. The full magnetic core could be formed as a single piece or as several pieces in a different configuration. These alternatives are within the scope of this invention. The cores can be made of any commercially available MnZn ferrite material formulated for power applications. In the preferred embodiment, the cores are E-cores made from N27 ferrite material supplied by the Siemens Corporation. Cores 106a and 106b are held in position by bobbin 112. Bobbin 112 is made of an insulating material such as polycarbonate with a low flammability factor. The bobbin provides mechanical attachment of the cores to the bus bars.

Figure 3:
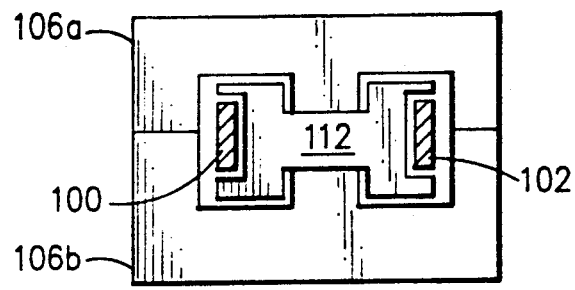
FIG. 3 is a cross-section of the portion of the power supply shown in FIG. 1 along section lines AA.

The placement of the cores with respect to the bus bars 100 and 102 is shown in greater detail in FIG. 3. E-cores 106a and 106b create a single turn inductor with respect to each bus bar 100, 102, thereby controlling differential noise. Since E-cores 106a and 106b completely surround both bus bars 100 and 102, they create a common mode choke around the bus bar pair.

Figure 4:
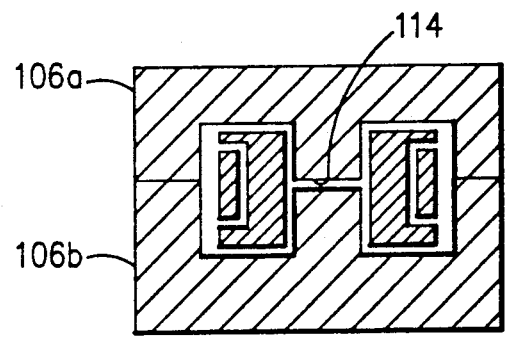
FIG. 4 is a cross-section of the portion of the power supply shown in FIG. 1 along the lines BB.

FIG. 4 is another cross-section of the choke showing more clearly the geometry of the choke. The center legs of E-cores 106a and 106b are machined to be slightly shorter than the other legs, creating an air gap 114 between the legs. The presence of this air gap prevents magnetic saturation of the core due to high current flow. The air gap in the present invention is approximately 3 mm, and is selected based upon current level.

The spacing of bus bars 100 and 102 is selected to meet the geometry requirements of E-cores 106a and 106b. The core geometry is chosen based on the power level and current level and can be determined by known methods. The geometry of the preferred embodiment was selected to provide ease of assembly.

Figure 5:
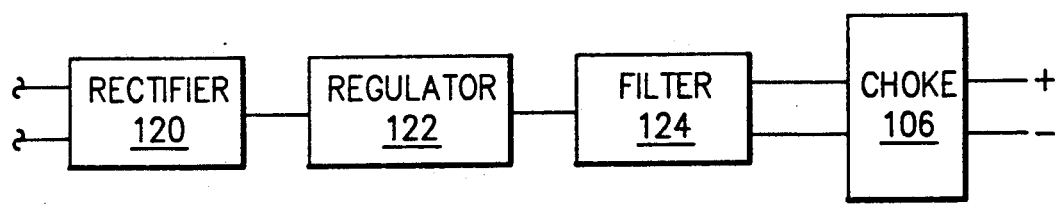
FIG. 5 is a block diagram of a power supply incorporating the present invention.

FIG. 5 is a block diagram of a power supply incorporating a dual mode choke according to the present invention. Rectifier 120 is connected to an AC voltage source. The output of rectifier 120 is regulated by switching regulator 122 and filtered by filter 124. The output from the capacitor section passes through dual mode choke 106.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. Apparatus for reducing electromagnetic emissions from a power supply supplying DC power to a load, said apparatus comprising:
   a first conductive bus bar connecting a first power supply lead to a first load terminal;
   a second conductive bus bar connecting a second power supply lead to a second load terminal, said first and second bus bars being oriented in spaced apart, generally parallel planes for a part of their length;
   a magnetic core located on said bus bars so that an outer perimeter magnetic path of said core surrounds both bus bars and a central magnetic path is formed between said bus bars; and
   means for holding said core in position with respect to said bus bars.

2. The apparatus of claim 1 wherein said central magnetic path is interrupted by an air gap to prevent magnetic saturation.

3. The apparatus of claim 1 wherein said magnetic core is comprised of two magnetic E-cores, said E-cores assembled to produce said outer perimeter and said central magnetic paths.

4. The apparatus of claim 3 wherein said E-cores have a first end leg, a center leg and a second end leg, and wherein said first and second end legs have equal lengths and wherein said center leg is shorter, forming an air gap when assembled.

5. An apparatus for transmitting DC voltage from a power converter to a load, said apparatus comprising:
   a first conductor connected between a first terminal of said power converter and a first terminal of said load;
   a second conductor connected between a second terminal of said power converter and a second terminal of said load, said second conductor being displaced from said first conductor and oriented in a plane generally parallel to said first conductor over at least a portion of their length;
   a magnetic core formed having two spaced apertures each to receive one of said conductors; and
   an insulator, said insulator mounted on said first and second conductors to insulate said conductors from said magnetic core, said core mounted on said insulator so that a first magnetic path is formed encompassing both conductors and a second magnetic path is formed between said conductors.

6. The apparatus of claim 5 wherein said cores is ferrite.

7. The apparatus of claim 5 wherein said second magnetic path is interrupted by an air gap, said air gap preventing magnetic saturation of said second magnetic path.

8. A power supply apparatus comprising:
   a transformer connected to a current source,
   a switching type regulator connected in electrical series to said transformer,
   a filter connected in electrical series to said regulator,
   two conductive bus bars connected to said filter, said bus bars extending in spaced apart parallel planes for at least a portion of their length,
   wherein output current flows through said two bus bars,
   noise reduction means for reducing the electromagnetic noise generated by said power supply, said noise reduction means comprising:
   a ferrite core surrounding both bus bars in a continuous loop forming an outer perimeter magnetic path,
   said ferrite core having two ferrite extensions extending between said bus bars, said ferrite extensions forming a central magnetic path between said bus bars, said extensions extending coaxially from opposite sides of said ferrite core but being separated by an air gap.

9. The apparatus of claim 8, a further comprising:
   means for retaining said core in position around said bus bars, said means for retaining being formed from an insulating material.

* * * * *